No. 675,727. Patented June 4, 1901.
E. F. GOLTRA.
SIDE BEARING FOR TRUCK BOLSTERS.
(Application filed Mar. 15, 1897.)
(No Model.)
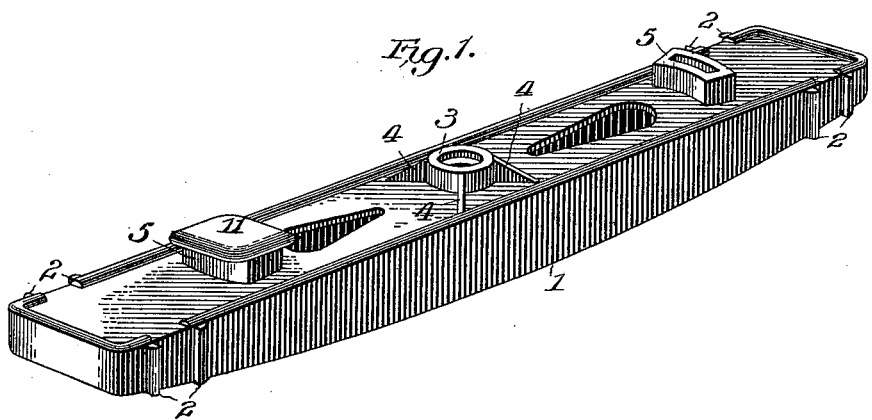
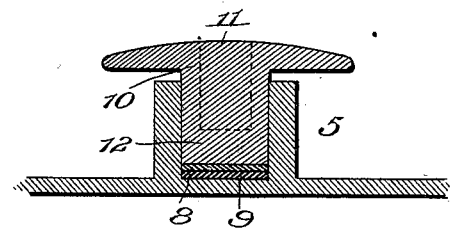
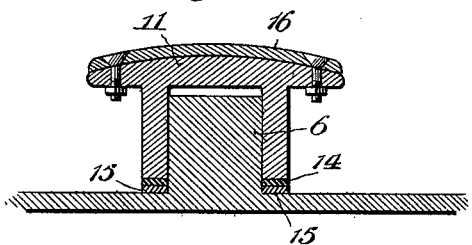
WITNESSES:
INVENTOR
Edw. F. Goltra,
BY
Lewis & Goldsborough
ATTORNEYS.

UNITED STATES PATENT OFFICE.

EDWARD F. GOLTRA, OF ST. LOUIS, MISSOURI.

SIDE BEARING FOR TRUCK-BOLSTERS.

SPECIFICATION forming part of Letters Patent No. 675,727, dated June 4, 1901.

Application filed March 15, 1897. Serial No. 627,641. (No model.)

*To all whom it may concern:*

Be it known that I, EDWARD F. GOLTRA, a citizen of the United States, residing at St. Louis, in the State of Missouri, have invented certain new and useful Improvements in Side Bearings for Truck-Bolsters; and I do hereby declare the following to be a full, clear, and exact description of the invention, such as will enable others skilled in the art to which it appertains to make and use the same.

My invention relates to truck-bolsters for railway-cars; and its purpose is to provide a truck-bolster with readily-removable side bearings adjustable vertically and replaceable when worn or otherwise damaged.

In the accompanying drawings, Figure 1 is a view in perspective of a truck-bolster with one side bearing in position thereon and the other removed to more clearly show the supporting cage or holder. Fig. 2 is a transverse vertical section through one of the side bearings and its supporting cage or holder, and Fig. 3 is a like view illustrating a modified form.

The reference-numeral 1 designates a truck-bolster provided with the usual column-guides 2 and tubular center bearing 3, braced or reinforced by radially-diverging webs 4 and adapted to receive the king-pin of the body-bolster.

In the form illustrated in Figs. 1 and 2 the side bearing is provided with a stem 12, constructed to set into a cage or holder 5 and having a wear or bearing plate 11, rounded or convex upon its upper surface and extending beyond the edge of the cage or holder, so as to constitute an extended bearing-surface.

Instead of making the stem of the side bearing to set within the holder I may, as illustrated in Fig. 3, make said stem hollow, so as to fit over a projection 6 upon the upper surface of the bolster, in which case the projection 6 serves as a holder for the hollow shank 13. In either case I provide for vertical adjustability of the side bearing. The adjustment may be obtained by means of shims or liners 8 9, placed within the hollow cage or holder of Fig. 2, or by annular shims or liners 14 15, placed about the holder 6 of Fig. 3. Moreover, wear-plates 16, as indicated in Fig. 3, may be employed for either side bearing, and said wear-plates may be removed and replaced by others when desired, either for purposes of renewing the wearing-surface or substituting a thicker wearing-plate for purposes of regulating the height of the bearing.

It will be apparent that the side bearings in either case are not only readily removable from their cages or holders, and therefore capable of being renewed when broken or unduly worn, but that they are also capable of vertical adjustability, permitting compensation for wear and adapting them also for use to the best advantage in instances where the body-bolster above varies in height from a given standard.

As indicated by the dotted line 10 in Fig. 2, the side bearing may have a recess for the reception of cotton-waste adapted to be saturated with oil, so as to furnish a lubricant to the bearing-surface 11.

In each form I provide an engagement between the bolster and the side bearings comprising a socket upon one of the parts and a coöperating projection on the other part. In Fig. 2, for instance, the stem 12 on the side bearing engages a socket formed by the cage or holder 5 on the bolster, while in Fig. 3 the projection 6 on the bolster engages the hollow stem 13 on the side bearing, which hollow stem constitutes a socket.

While the specific construction illustrated in the drawings is practicable and satisfactory, it will be apparent that both the side bearings and cage or holder may be varied in form from the illustration in the drawings, and my invention comprehends all such changes or modifications of the invention as may fairly fall within the scope of the following claims.

Having thus described my invention, what I claim is—

1. The combination with a truck-bolster, and a side bearing, a socket upon one of said parts and a projection upon the other to engage said socket, said side bearing having a head projecting laterally of the engaging members.

2. The combination with a truck-bolster provided with hollow cages or holders, of removable side bearings each comprising a rounded head or bearing-plate projecting laterally beyond the holder, and a depending stem setting into said holder.

In testimony whereof I affix my signature in presence of two witnesses.

EDWARD F. GOLTRA.

Witnesses:
 JOHN C. PENNIE,
 J. A. GOLDSBOROUGH.